US011167988B2

(12) United States Patent
Ostuni et al.

(10) Patent No.: US 11,167,988 B2
(45) Date of Patent: Nov. 9, 2021

(54) PROCESS FOR NITRIC ACID PRODUCTION

(71) Applicant: CASALE SA, Lugano (CH)

(72) Inventors: Raffaele Ostuni, Lugano (CH); Jean François Granger, Lugano (CH); Giada Franceschin, Como (IT); Pierdomenico Biasi, Como (IT)

(73) Assignee: CASALE SA, Lugano (CH)

( * ) Notice: Subject to any disclaimer, the term of this patent is extended or adjusted under 35 U.S.C. 154(b) by 0 days.

(21) Appl. No.: 16/334,904

(22) PCT Filed: Jun. 27, 2017

(86) PCT No.: PCT/EP2017/065882
§ 371 (c)(1),
(2) Date: Mar. 20, 2019

(87) PCT Pub. No.: WO2018/054565
PCT Pub. Date: Mar. 29, 2018

(65) Prior Publication Data
US 2019/0284052 A1 Sep. 19, 2019

(30) Foreign Application Priority Data
Sep. 23, 2016 (EP) .................................... 16190504

(51) Int. Cl.
C01B 21/40 (2006.01)
C01C 1/04 (2006.01)
(Continued)

(52) U.S. Cl.
CPC .............. C01B 21/40 (2013.01); C01B 3/025 (2013.01); C01B 3/382 (2013.01); C01B 21/26 (2013.01);
(Continued)

(58) Field of Classification Search
None
See application file for complete search history.

(56) References Cited

U.S. PATENT DOCUMENTS 3,716,625 A * 2/1973 Oberste-Berghaus ...................... C01B 21/26
423/392
3,927,182 A * 12/1975 Powell .................... C01B 21/26
423/392
(Continued)

FOREIGN PATENT DOCUMENTS

WO 2005082779 A2 9/2005

OTHER PUBLICATIONS

Machine Translation of WO2005/082779A2, original published: Feb. 18, 2005. Printed Dec. 29, 2020. (Year: 2005).*
(Continued)

Primary Examiner — Anthony J Zimmer
(74) Attorney, Agent, or Firm — Dorsey & Whitney LLP

(57) ABSTRACT

Integrated process for the synthesis of ammonia and nitric acid, comprising a synthesis of nitric acid including the following steps: a) subjecting a stream of ammonia (10) to catalytic oxidation, obtaining a gaseous stream containing nitrogen oxides (13); b) subjecting said gaseous stream to a process of absorption of nitrogen oxides, providing nitric acid (16) and a tail gas (17) containing nitrogen and residual nitrogen oxides; c) subjecting at least a portion of said first tail gas (17) to a process of removal of nitrogen oxides, providing a nitrogen oxides-depleted tail gas (18), and comprising a synthesis of ammonia by catalytic conversion of a make-up gas (126, 226) comprising hydrogen and nitrogen in an ammonia synthesis loop, wherein at least a portion (18b, 18d, 21) of said second tail gas is used as nitrogen source for obtaining said make-up gas (126, 226).

9 Claims, 4 Drawing Sheets

(51) Int. Cl.
| | |
|---|---|
| *C01B 3/02* | (2006.01) |
| *C01B 21/26* | (2006.01) |
| *C01B 3/38* | (2006.01) |
| *B01D 53/56* | (2006.01) |
| *B01D 53/047* | (2006.01) |

(52) U.S. Cl.
CPC .......... C01C 1/0405 (2013.01); C01C 1/0488 (2013.01); *B01D 53/047* (2013.01); *B01D 53/56* (2013.01); *B01D 2256/12* (2013.01); *B01D 2257/404* (2013.01); *C01B 2203/0233* (2013.01); *C01B 2203/0261* (2013.01); *C01B 2203/0283* (2013.01); *C01B 2203/043* (2013.01); *C01B 2203/0445* (2013.01); *C01B 2203/068* (2013.01); *C01B 2203/127* (2013.01); *C01B 2203/1241* (2013.01); *C01C 1/0417* (2013.01); *Y02C 20/20* (2013.01); *Y02P 20/10* (2015.11); *Y02P 20/52* (2015.11)

(56) References Cited

U.S. PATENT DOCUMENTS

| | | | | | |
|---|---|---|---|---|---|
| 3,977,832 | A | * | 8/1976 | Schofield | ............ B01J 19/0006 422/109 |
| 4,042,339 | A | * | 8/1977 | Haselden | ................ C01B 21/40 422/612 |
| 4,198,379 | A | | 4/1980 | James | |
| 4,298,588 | A | * | 11/1981 | Pinto | ...................... C01B 3/025 423/359 |
| 4,869,890 | A | * | 9/1989 | Adams | .................... C01B 21/26 423/392 |
| 6,086,840 | A | * | 7/2000 | Whitney | ................ C01B 3/025 422/148 |
| 2005/0106092 | A1 | * | 5/2005 | Dziobek | ................ C01B 21/26 423/392 |
| 2015/0098881 | A1 | | 4/2015 | Perbandt | |

OTHER PUBLICATIONS

Moon, "Advanced process control for syngas units", Nitrogen + Syngas, British Sulphur Publishing, London, GB, No. 296, Nov. 1, 2008, pp. 30-35.

International Search Report from International Application No. PCT/EP2017/065882 dated Aug. 17, 2017.

PCT Notification of Transmittal of the International Preliminary Report on Patentability for International Application No. PCT/EP2017/065882 dated Nov. 27, 2018.

* cited by examiner

PROCESS FOR NITRIC ACID PRODUCTION

FIELD OF THE INVENTION

The invention relates to the field of nitric acid production.

PRIOR ART

Nitric acid is synthesized by reacting ammonia and oxygen.

The synthesis of nitric acid basically comprises the following steps: catalytic oxidation of ammonia with atmospheric oxygen to yield nitrogen monoxide (NO); oxidation of the nitrogen monoxide product to nitrogen dioxide ($NO_2$) or dinitrogen tetroxide ($N_2O_4$); absorption of the nitrogen oxides to yield nitric acid. The catalytic oxidation of ammonia is also referred to as ammonia combustion hereinbelow.

During the ammonia combustion, minor amounts of ammonia participates in undesirable side reactions leading to formation of nitrous oxides ($N_2O$).

For the sake of simplicity, the term of nitrogen oxides denotes nitrogen monoxide, nitrogen dioxide, dinitrogen tetroxide and nitrous oxides. Nitrogen oxides are indicated as $NO_x$.

The nitric acid synthesis processes can be differentiated into monopressure (single-pressure) and dual-pressure (split-pressure).

In mono-pressure processes, ammonia combustion and $NO_x$ absorption take place at the same working pressure. They generally include medium-pressure (2-6 bar) and high-pressure (7-11 bar) processes.

In dual-pressure processes, the absorption pressure is higher than the combustion pressure. Modern dual-pressure plants feature combustion at 4-6 bar and absorption at 9-14 bar.

The step of $NO_x$ absorption is performed in an absorption tower, which provides nitric acid from the bottom and a tail gas as overhead product. Said tail gas mainly contains nitrogen (about 95-98% mol), oxygen (up to 4% mol) and residual $NO_x$ (generally 200-300 ppm, in some cases 3000 ppm or higher).

Said tail gas is commonly subjected to a $NO_x$ removal step in a suitable catalytic $NO_x$ removal unit in order to minimize the $NO_x$ emissions in the atmosphere. Several methods are known to control the $NO_x$ emissions.

The most widely used family of $NO_x$ control techniques is the catalytic reduction, because it allows reaching the lowest levels of residual $NO_x$, i.e. less than 50 ppm. The catalytic reduction can be differentiated into selective (referred to as SCR) or non-selective (referred to as NSCR): the SCR leaves some ammonia and all the oxygen in said treated tail gas, while the NSCR leaves some unconverted fuel (e.g. hydrocarbons or hydrogen) and CO, and may also release some amounts of ammonia and $CO_2$.

According to the prior art, the so obtained treated tail gas is commonly work-expanded in a proper expander from the absorption tower overhead pressure to the atmospheric pressure.

Depending on the preheating temperature, the expander provides from 35% to 100%, typically 70%, of the power required by the compressors of the nitric acid plant, i.e. the air compressor for monopressure processes and the air and the nitrogen oxides compressors for the dual-pressure processes, while the balance power is provided by a steam turbine or motor.

It is strongly desirable to minimize the power needed for the steam turbine or motor. To this purpose, the tail gas is preheated and work-expanded to near atmospheric pressure to such an extent that the nitric acid process produces enough steam to cover the balance or only a minimum amount of additional steam must be imported or produced in a utility steam boiler.

The exhaust gas from the expander essentially contains nitrogen and residual quantities of other components. Said exhaust gas is commonly discharged into the atmosphere, which entails a loss of nitrogen.

SUMMARY OF THE INVENTION

The invention aims to provide a nitric acid process, which is simple, cost effective, efficient and environmentally friendly.

The idea forming the basis of the invention is to use part of the tail gas effluent from the absorption tower of a nitric acid plant as nitrogen source for the synthesis of ammonia, which is indeed strongly discouraged in the prior art because it would entail a significant loss of power from the tail gas expander of the plant.

These aims are reached with an integrated process for the synthesis of ammonia and nitric acid according to claim 1.

Said process comprises a synthesis of nitric acid including the following steps:

a) subjecting a stream of ammonia to oxidation, obtaining a gaseous stream containing nitrogen oxides;

b) subjecting said gaseous stream to a process of absorption of nitrogen oxides, providing nitric acid and a first tail gas containing nitrogen and residual nitrogen oxides;

c) subjecting at least a portion of said first tail gas to a process of removal of nitrogen oxides, providing a second tail gas containing nitrogen and having a lower content of nitrogen oxides than said first tail gas, and comprising a synthesis of ammonia by catalytic conversion of a make-up gas comprising hydrogen and nitrogen in an ammonia synthesis loop, wherein at least a portion of said second tail gas is a nitrogen source for said make-up gas.

The term of "make-up gas" denotes a synthesis gas comprising hydrogen ($H_2$) and nitrogen ($N_2$) in a ratio of about 3:1 required for the synthesis of ammonia ($NH_3$).

Said step of oxidation a) is advantageously carried out in the presence of air or enriched air, they supplying both oxygen to oxidize ammonia and nitrogen to obtain said second tail gas.

Said process of oxidation substantially comprises a first stage of catalytic oxidation of ammonia into nitrogen monoxide (NO) and minor amounts of nitrous oxides ($N_2O$), and a second stage of oxidation of the nitrogen monoxide into nitrogen dioxide ($NO_2$) or dinitrogen tetroxide ($N_2O_4$). Said air or enriched air is supplied upstream of said first stage, upon being compressed in a suitable air compressor, wherein its pressure is elevated from the atmospheric pressure to the oxidation pressure.

The oxidation pressure is different in monopressure and dual pressure processes. Preferably, said steps a) and b) are carried out at 7-11 bar (according to high monopressure processes), or said step a) at 4-6 bar and said step b) at 9-14 bar (according to dual pressure processes). Preferably, the content of nitrogen oxides in said second tail gas is negligible or substantially negligible, meaning that the nitrogen oxides contained in said first tail gas are entirely or substantially entirely removed during said step c).

Typically, said second tail gas is mainly composed of nitrogen and contains some residual components. Said residual components depend on the nature of the process carried out during said step c) and can comprise oxygen, water, methane, ammonia, carbon monoxide and carbon dioxide. Oxygen is typically contained in relatively small concentrations, i.e. less than 5% mol.

For the sake of simplicity, the nitrogen oxides (NO, $N_2O$, $NO_2$, $N_2O_4$) are referred to as $NO_x$ and said second tail gas is also referred to as $NO_x$-depleted tail gas.

According to an embodiment of the invention, the first tail gas obtained with said absorption step b) is entirely or substantially entirely subjected to said removal step c) and the resulting $NO_x$-depleted tail gas is partially used as nitrogen source to obtain said make-up gas. Accordingly, said $NO_x$-depleted tail gas splits into a first portion and a second portion. Preferably, said second portion is work-expanded in a suitable expander to provide at least part of the power required for the synthesis of nitric acid and said first portion is used as nitrogen source to obtain said make-up gas, without being work-expanded.

Preferably, the first portion is smaller than the second portion, because the $NO_x$-depleted tail gas of a nitric acid process contains nitrogen in large excess with respect to that required to obtain the ammonia input stream of the nitric acid process. This is due to the large consumption of oxygen in the process for the synthesis of nitric acid, which entails an air consumption of about 10 kmol per kmol of $NH_3$ consumed by said process; this leaves about 8 kmol of nitrogen in the tail gas per kmol of $NH_3$ consumed. Considering that the ammonia synthesis process consumes only 0.5 kmol $N_2$ per kmol $NH_3$, about $1/16$ (i.e. about 6.3%) of the nitrogen contained in the tail gas is sufficient to produce the ammonia consumed by the nitric acid process. In this respect, a 1,100 MTD nitric acid plant could provide enough nitrogen for producing 4,700 MTD ammonia. Accordingly, said first and second portions are also referred to as tail gas slipstream and tail gas mainstream, respectively.

According to another embodiment of the invention, the first tail gas obtained with said absorption step b) is partially subjected to said removal step c). Accordingly, said tail gas splits into two portions, a first portion undergoing said step c) and a second portion undergoing a further step for removal of nitrogen oxides. In other words, said two portions of tail gas are independently subjected to a $NO_x$ removal step, thus providing two separate streams of $NO_x$-depleted tail gas. In particular, a second stream of $NO_x$-depleted tail gas is preferably work-expanded to provide at least part of the power required for the synthesis of nitric acid and a first stream of $NO_x$-depleted tail gas is used as nitrogen source to obtain said make-up gas, without being work-expanded. As above, the first portion is smaller than the second portion and said first and second portions are also referred to as tail gas slipstream and tail gas mainstream, respectively.

An advantage of the latter embodiment is that said two portions of the first tail gas may be subjected to $NO_x$ removal steps of different type, thus obtaining streams of $NO_x$-depleted tail gas of different compositions according to the purpose they are addressed, as will be better explained later in the description.

Accordingly, the at least a portion of said second tail gas used as nitrogen source for obtaining the ammonia make-up gas is not subjected to work-expansion.

Said integrated process is preferably carried out in a plant comprising an ammonia section and a nitric acid section. According to preferred embodiments, the input stream of ammonia is provided by said ammonia section to said nitric acid section through an intermediate storage. This means that the catalytic conversion of the make-up gas into ammonia and the step a) of catalytic oxidation of ammonia are not synchronized, thus providing a greater flexibility to the process.

According to a first embodiment of the invention, said at least a portion of $NO_x$-depleted tail gas is added to a hydrogen-containing synthesis gas, thus providing said make-up gas.

Said hydrogen-containing synthesis gas is preferably obtained by conversion of a hydrocarbon feedstock, providing a raw hydrogen-containing synthesis gas, and subsequent purification of said raw gas.

The conversion of said hydrocarbon feedstock preferably includes at least one of reforming and catalytic partial oxidation (CPOx) of the hydrocarbon feedstock, the reforming being carried out in a reforming section and the CPOx being carried out in a CPOx unit. Said hydrocarbon feedstock is preferably a light hydrocarbon feedstock, such as natural gas.

According to various embodiments, said reforming section includes a primary reformer and optionally a secondary reformer fed with air, oxygen or enriched air. The primary reformer is preferably a steam reformer, but can also include a combination of a steam reformer and a gas heated reformer (GHR). In some embodiments, the reforming section includes an auto-thermal reformer (ATR).

According to a particular embodiment, said reforming section only comprises a primary reformer without a subsequent secondary reformer. Reforming performed solely in a primary reformer is also termed pure reforming.

The raw synthesis gas obtained by conversion of the hydrocarbon feedstock typically comprises hydrogen and contains some impurities, such as carbon monoxide (CO), carbon dioxide (CO2) and methane ($CH_4$).

The purification of said raw gas preferably comprises: a step of CO shift conversion into CO2, a step of CO2 removal and, optionally, a step of methanation. Preferably said CO2 removal step is carried out in a pressure swing adsorption (PSA) unit, wherein: (1) CO2 is adsorbed on a suitable adsorbent material and a hydrogen-rich stream is produced; (2) the CO2 is desorbed and the adsorbent material regenerated by lowering the pressure; (3) the pressure is increased back to adsorption pressure level.

The so obtained make-up gas is compressed to the pressure of the synthesis loop within a make-up gas compressor and subsequently converted into ammonia.

Preferably, said at least a portion of $NO_x$-depleted tail gas used as nitrogen source for obtaining said make-up gas (i.e. tail gas slipstream) is supplied just before the catalytic conversion of the make-up gas into ammonia, namely at the suction of said make-up gas compressor.

Alternatively, said tail gas slipstream may be supplied to said PSA unit, wherein it is used as sweep gas for the adsorbent material regeneration. This embodiment has the advantage of achieving a higher hydrogen recovery, but the drawback of entailing a higher nitrogen consumption than the stoichiometric amount required to obtain the ammonia make-up gas.

The above described embodiments, wherein the tail gas slipstream is supplied at the suction of the make-up gas compressor or to the PSA unit, are particularly preferred when said hydrogen-containing synthesis gas is obtained by pure reforming (i.e. in a primary reformer without a secondary reformer), as will be better described later in the description.

In a particular embodiment of the invention, said make-up gas is obtained with a process comprising primary steam reforming of a hydrocarbon feedstock followed by secondary reforming or by catalytic partial oxidation (CPOx), the secondary reforming being carried out in a secondary reformer and the CPOx being carried out in a CPOx unit. According to this embodiment, the second tail gas used as nitrogen source for obtaining the make-up gas is preferably supplied at the inlet of said secondary reformer or said CPOx unit.

The following description will first relate to the embodiment of the invention wherein the tail gas acting as nitrogen source for obtaining the make-up gas is mixed with the above defined hydrogen-containing synthesis gas (referred to as "first embodiment"), and then to the embodiment wherein said tail gas is supplied to the secondary reformer or to the CPOx unit (referred to as "second embodiment").

First Embodiment

Preferably, the nitrogen required to obtain the above make-up gas is entirely supplied by said at least a portion of $NO_x$-depleted tail gas. This makes unnecessary the air separation unit (ASU) used in the prior art to supply nitrogen to the purified hydrogen-containing synthesis gas, especially when produced by pure steam reforming of a light hydrocarbon feedstock such as natural gas. This is a significant advantage over the prior art and makes the process of the invention simpler and more cost effective, since the elevated costs related to the provision of an ASU can be completely avoided.

According to preferred embodiments, said step b) of $NO_x$ absorption is carried out substantially at the same pressure of said hydrogen-containing synthesis gas, so that no compressor is needed to supply the nitrogen-containing tail gas to the ammonia process. Preferably, said step is carried out at a pressure of at least 15 bar. This is another great advantage over the prior art processes, wherein a compressor is used to compress the nitrogen produced by the ASU from the atmospheric pressure to the reforming pressure of e.g. 15 bar.

According to other embodiments, said step b) is carried out at a lower pressure than the pressure of the hydrogen-containing synthesis gas, but still higher than atmospheric. In this case, a much simpler, cheaper and less energy intensive booster is used to supply the tail gas used as nitrogen source to the ammonia process instead of the nitrogen compressor typically used in the processes of the prior art.

Hence, the ASU and the nitrogen compressor are not required according to this embodiment of the invention, which is a significant advantage since they are the major cost items for the whole ammonia plant, being worth about 20% of the total equipment cost, and also consume much energy.

As already mentioned above, said embodiment is particularly preferred when the hydrogen-containing synthesis gas mixing with said at least a portion of the $NO_x$-depleted tail gas is obtained by pure reforming, preferably carried out in a steam reformer, optionally combined with a GHR. Autothermal reforming (ATR) or CPOx would be also viable but less preferable, since they would require an oxygen ASU that would offset the advantage of avoiding the nitrogen ASU.

According to some embodiments, the $NO_x$-depleted tail gas provided by said step c) contains residual oxygen compounds (e.g. $O_2$, CO, $CO_2$, water . . . ), which are a poison for the ammonia synthesis catalyst. Accordingly, the $NO_x$-depleted tail gas used to provide nitrogen to the ammonia process (i.e. the tail gas slipstream) is subjected to an oxygen removal treatment downstream of step c) in order to reduce the concentration of oxygen compounds to an acceptable level for the ammonia process catalysts.

Preferably, said treatment is a pressure swing adsorption (PSA) process, according to which oxygen is adsorbed on a suitable adsorbent material and a nitrogen-rich stream is produced. Preferably, said adsorbent material also has affinity for $NO_x$ and water, so that a dry and $NO_x$-free nitrogen-rich stream is obtained. Examples of adsorbent materials are activated carbon (e.g. the so called "carbon molecular sieves") and zeolites.

Said treatment ensures high nitrogen purity and high nitrogen recovery, while retaining a simple layout and avoiding the use of additional catalysts. A high nitrogen recovery is desirable to minimize the flow rate of the tail gas slipstream withdrawn from the nitric acid process, hence to maximize the power recovery from the tail gas mainstream expander.

Alternative oxygen removal treatments include at least one among: selective permeation across nitrogen membranes, cryogenic nitrogen purification, catalytic oxygen removal on a platinum-based or palladium-based "deoxo" catalyst, catalytic partial oxidation (i.e. "CPOx", for example over Pt/Pd based catalyst), methanation over nickel-based catalyst. Said processes are however less preferred.

When said oxygen removal treatment is performed in a PSA unit, the integrated process of the invention is preferably started-up by feeding an air stream to the PSA unit, wherein oxygen is adsorbed and nitrogen is released and supplied to the ammonia process. Preferably, said air stream is provided by the above mentioned air compressor of the nitric acid plant providing air to said oxidation step a).

According to different embodiments, said air stream is sent to the PSA unit either directly, i.e. bypassing the nitric acid process, or through the nitric acid plant, e.g. the nitric acid absorber wherein said step b) is carried out.

According to less preferred embodiments, the integrated process of the invention is started-up by storing a certain amount of ammonia to be fed to the nitric acid plant.

Second Embodiment

According to various embodiments, the primary reforming of a light hydrocarbon such as natural gas is followed by secondary reforming or by catalytic partial oxidation (CPOx). The secondary reforming and the COPx are carried out in the presence of an oxidant, which is preferably provided by an air stream.

According to various embodiments, the tail gas slipstream is mixed with the air stream acting as oxidant source before its admission into the secondary reformer or into the CPOx unit, or it is directly injected into said secondary reformer or into said CPOx unit. The term "directly" denotes that said slipstream does not mix with said air stream before entering the secondary reformer or CPOx unit.

According to some embodiments, said step b) is carried out substantially at the same pressure of the secondary reforming or the CPOx and no booster is required to supply tail gas slipstream to said secondary reforming or to said CPOx.

According to other embodiments of the invention, said step b) is carried out at a lower pressure than the secondary reforming or the CPOx and said tail gas slipstream is compressed in a booster before being supplied to the secondary reformer or the CPOx unit.

An advantage related to the supply of the $NO_x$-depleted tail gas to the secondary reformer or to the CPOx unit is that no treatment is required to either reduce the $NO_x$ content nor to eliminate the oxygen, as both of them can be converted at high temperature within said secondary reformer or said CPOx unit.

The nitrogen required to obtain the above make-up gas can be partially or entirely provided by said $NO_x$-depleted tail gas slipstream. In the former case, the balance nitrogen is preferably supplied by said input air stream to the secondary reformer or to the CPOx unit. In the latter case, provided that the $NO_x$-depleted tail gas contains some oxygen, the oxidant required for carrying out the secondary reforming or the COPx is provided by the $NO_x$-depleted tail gas itself and said the supply of air is no longer required.

Hence, supplying the $NO_x$-depleted tail gas at the inlet of the secondary reformer or the CPOx unit also carries the advantage of reducing, or avoiding, the amount of air used as nitrogen and oxidant source. This entails the unloading or avoidance of the air compressor required in the prior art to elevate the pressure of the air stream from the atmospheric pressure to the reforming or CPOx pressure.

According to a particular embodiment, wherein the nitrogen required to obtain the above make-up gas is partially provided by said slipstream tail gas and the balance nitrogen is supplied by the air stream feeding the reformer or CPOx unit, and wherein the absorption step b) is carried out at a lower pressure than the reforming or CPOx, the slipstream tail gas is injected at an appropriate stage of an air compressor elevating the pressure of said air stream to the reforming or CPOx pressure, thus making the booster unnecessary.

Due to the lower amount of oxygen in the $NO_x$-depleted tail gas (i.e. <5%) than air (i.e. about 21%), the process of the invention results in a lower content of oxygen admitted to the secondary reformer or the CPOx unit, while feeding the same amount of nitrogen.

As a consequence, the outlet temperature of the primary reformed must be increased compared to the prior art to reach substantially the same hydrocarbon conversion and total hydrogen production. This involves a smaller duty of the secondary reforming or CPOx and a greater duty of the primary reforming if compared with conventional ammonia processes.

An advantage related to the compensation of the smaller duty of the secondary reforming or CPOx with the increased duty of the primary reforming is a smaller generation of $CO_2$. This aspect will appear more clear with the aid of the following example.

The primary reforming of methane ($CH_4$) produces four moles of $H_2$ and one mole of $CO_2$ per mole of $CH_4$ consumed, while the partial oxidation of methane occurring in the secondary reformer or in the CPOx unit produces three moles of $H_2$ and one mole of $CO_2$ per mole of $CH_4$ consumed. Accordingly, a greater duty of the primary reforming and a smaller duty of the secondary reforming or CPOx provides for a lower amount of $CO_2$ in the raw hydrogen-containing product gas.

According to the second embodiment of the invention, the integrated process of the invention is preferably started-up by feeding an air stream to the secondary reformer or the CPOx unit, which acts as nitrogen source to obtain the ammonia make-up gas before the beginning of the operations of the nitric process.

The advantages of the second embodiment of the invention are summarized below.

Some advantages are related with the supply of nitrogen at the inlet of the secondary reformer or CPOx unit. First of all, the residual oxygen contained in the $NO_x$-depleted tail gas slipstream is used in the process of secondary reforming or catalytic partial oxidation to generate said hydrogen-containing product gas, thus making unnecessary or reducing the amount of air acting as source of oxidant. Moreover the $NO_x$-depleted tail gas can be supplied as such to the ammonia process, without being further subjected to purification treatments, which would entail losses of nitrogen and increase costs.

The low oxygen content of the $NO_x$-depleted tail gas feeding the secondary reformer or CPOx unit if compared with that of air reduces the duty of the secondary reforming or CPOx while increases that of the primary reforming. As already mentioned above, this results in: a smaller production of $CO_2$ compared to conventional processes, which reduces the flow rate of the effluent gas from the secondary reformer and unloads the $CO_2$ removal unit, and in a lower temperature into the reformed gas waste heat boiler, which entails an unloaded the steam system, a reduced steam or power surplus and a reduced total gas consumption.

Ultimately, the ammonia process can be started up independently from the nitric acid process and its capacity can be increased when the nitrogen from the nitric acid process becomes available.

Another aspect of the invention relates to the $NO_x$ removal step c).

When the tail gas provided by the absorption step b) is entirely or substantially entirely subjected to the removal step c) and the resulting $NO_x$-depleted tail gas splits into two portions, said $NO_x$ removal step preferably comprises a non-selective catalytic reduction (NSCR) process, which provides a $NO_x$-depleted tail gas comprising nitrogen and residual components such as methane, CO and $CO_2$, and substantially rid of oxygen.

The presence of said residual components in the tail gas is an important benefit especially when it is supplied to the secondary reformer or CPOx unit (second embodiment) for the following reason. The excess fuel provided to the NSCR process in order to ensure a substantially total conversion of the $NO_x$ partially reacts in the secondary reformer or the CPOx unit and partially is advantageously recovered in the purge gas of the ammonia synthesis loop and used as fuel in the ammonia plant, thereby retaining its energy level and avoiding its emission into atmosphere.

Another advantage of the NSCR process is related to the provision of a tail gas substantially free of oxygen, which avoids the necessity of an oxygen removal system, such as a PSA unit, even when the $NO_x$-depleted tail gas is supplied at the suction of the syngas compressor (first embodiment). In this case and according to various embodiments, the residual content of CO and $CO_2$ in the tail gas can be reduced by means of an additional purification step upstream of the syngas compressor or by carrying out the NSCR process in the presence of a reducing agent, e.g. hydrogen or a mixture of methane and hydrogen.

Preferably, said additional purification step comprises a methanation step for conversion of CO and CO2 into methane.

According to other embodiments, said $NO_x$ removal step c) comprises a PSA process, which carries the following advantages.

First of all, it allows to concurrently remove NOx, oxygen and possibly water, using one or more layers of adsorbents with affinity for NOx, oxygen and possibly water rather than for nitrogen.

Another advantage is that the nitrogen-containing tail gas is provided at about the same pressure and temperature as the absorption, meaning that there is neither significant pressure drop nor temperature variation between the PSA feed and PSA nitrogen effluent, hence the nitrogen-containing tail gas can be directly sent to the suction of the syngas compressor without any further compression or cooling.

According to further embodiments, the $NO_x$ removal step comprises a chemical absorption process.

As already mentioned above, when the tail gas from said step b) splits into two portions before being subjected to the $NO_x$ removal step c), each of said portions may undergo a dedicated process. For example, the tail gas slipstream undergoes a $NO_x$ removal step including purification by PSA in order to remove both $NO_x$ and $O_2$, while the tail gas mainstream undergoes a $NO_x$ removal step including a selective catalytic reduction process (SCR) to control the $NO_x$ upstream of the tail gas expander.

Other objects of the invention are a plant and a method of revamping according to the annexed claims.

According to the method of revamping of claim 18, an existing plant for the synthesis of ammonia and nitric acid is revamped by:

splitting said nitrogen oxides-depleted tail gas into two streams, a first stream supplying nitrogen to said purified hydrogen-containing product gas to obtain said ammonia make-up gas and a second stream being work-expanded in said expander.

Preferably, said method of revamping is also characterized by installing an oxygen removal unit downstream of said nitrogen oxides removal unit, said oxygen removal unit receiving said first stream of nitrogen oxides-depleted tail gas.

According to another embodiment, said existing plant for the synthesis of ammonia and nitric acid can be revamped by:

installing a further nitrogen oxides-removal unit;

splitting the tail gas provided by the absorption tower into two streams, a first stream being sent to the existing $NO_x$-removal unit and a second stream being sent to the newly installed $NO_x$-removal unit, thus providing two separated NOx-depleted tail gas streams, a first NOx-depleted stream being work-expanded in said expander and a second $NO_x$-depleted stream supplying nitrogen to said purified hydrogen-containing product gas to obtain said ammonia make-up gas.

When the nitrogen required to obtain said make-up gas is entirely provided by said $NO_x$-depleted tail gas, the above methods of revamping are also characterized by dismissing the existing air separation unit used to supply nitrogen to the hydrogen-containing product gas. According to a preferred embodiment, said methods of revamping are further characterized by dismissing the nitrogen compressor combined with the air separation unit.

When the absorption tower of the nitric acid plant is operated at a lower pressure than the pressure of the hydrogen-containing synthesis gas, a booster is preferably installed which receives the NOx-depleted stream acting as nitrogen source to obtain an ammonia make-up gas. Said booster is much simpler, cheaper and less energy intensive than the dismissed compressor.

Preferably, the nitrogen booster is a single stage booster. Indeed, according to the present invention, even a simple booster (i.e. with one stage of compression) is able to reach the suction pressure of the make-up gas compressor, which is typically of 15-30 bar, both in a mono-pressure and dual-pressure processes.

For example, said single stage booster has a compression ratio of more than 3, thus compressing to 15-20 bar an inlet stream at 5 bar or to 30-40 bar an inlet stream at 9-14 bar.

Another object of the present invention is the use of a nitrogen-containing tail gas provided by a nitric acid plant as nitrogen source for obtaining an ammonia make-up gas in an ammonia plant, said nitric acid plant comprising:

a reactor, wherein a stream of ammonia is oxidized to provide a gaseous stream containing nitrogen oxides;

an absorption tower, wherein at least part of said nitrogen oxides is absorbed providing nitric acid and a first tail gas containing nitrogen and residual nitrogen oxides;

a nitrogen oxides-removal unit, receiving at least part of said first tail gas to provide a second tail gas containing nitrogen and having a lower content of nitrogen oxides than said first tail gas, at a least a portion of said second tail gas forming said nitrogen source for obtaining the ammonia make-up gas.

The advantages of the invention are summarized as follows: recycle of at least a portion of the $NO_x$-depleted tail gas to the ammonia process which significantly reduces the emissions of the nitric acid exhaust gas into the atmosphere, less stringent requirements on the reducing gas (i.e. ammonia) slip from the SCR, less stringent requirements on the reducing gas (i.e. methane, $H_2$) or residual compounds (CO, $CO_2$) slip from the NSCR, reduction of the total energy consumption for the ammonia and nitric acid processes, despite the reduced power extracted from the expander, as demonstrated by the example below.

A further advantage derives from the fact that the integration between the ammonia and nitric acid production takes place through a by-product stream of the nitric acid process, i.e. $NO_x$-depleted tail gas, which means that the main interference between the two processes is the pressure equalization of the absorption step b) and front-end section. As a consequence, the processes for the synthesis of ammonia and nitric acid can be run almost independently.

In addition, the first embodiment of the invention provides for: avoidance of the air separation unit and avoidance or great simplification of the nitrogen compressor. Hence, the process of the invention benefits of a reduction of the total power consumption, notwithstanding less tail gas is expanded; the power saved with the process of the invention can be advantageously used to increase the capacity of the nitric acid plant, for example to provide more steam to the nitric acid compressor train.

On the other hand, the second embodiment of the invention provides for: avoidance or great simplification of the air compressor; reduced production of CO2 and smaller load on CO2 removal.

The advantages will emerge even more clearly with the aid of the detailed description below relating to a preferred embodiment.

DETAILED DESCRIPTION

Figure 1:
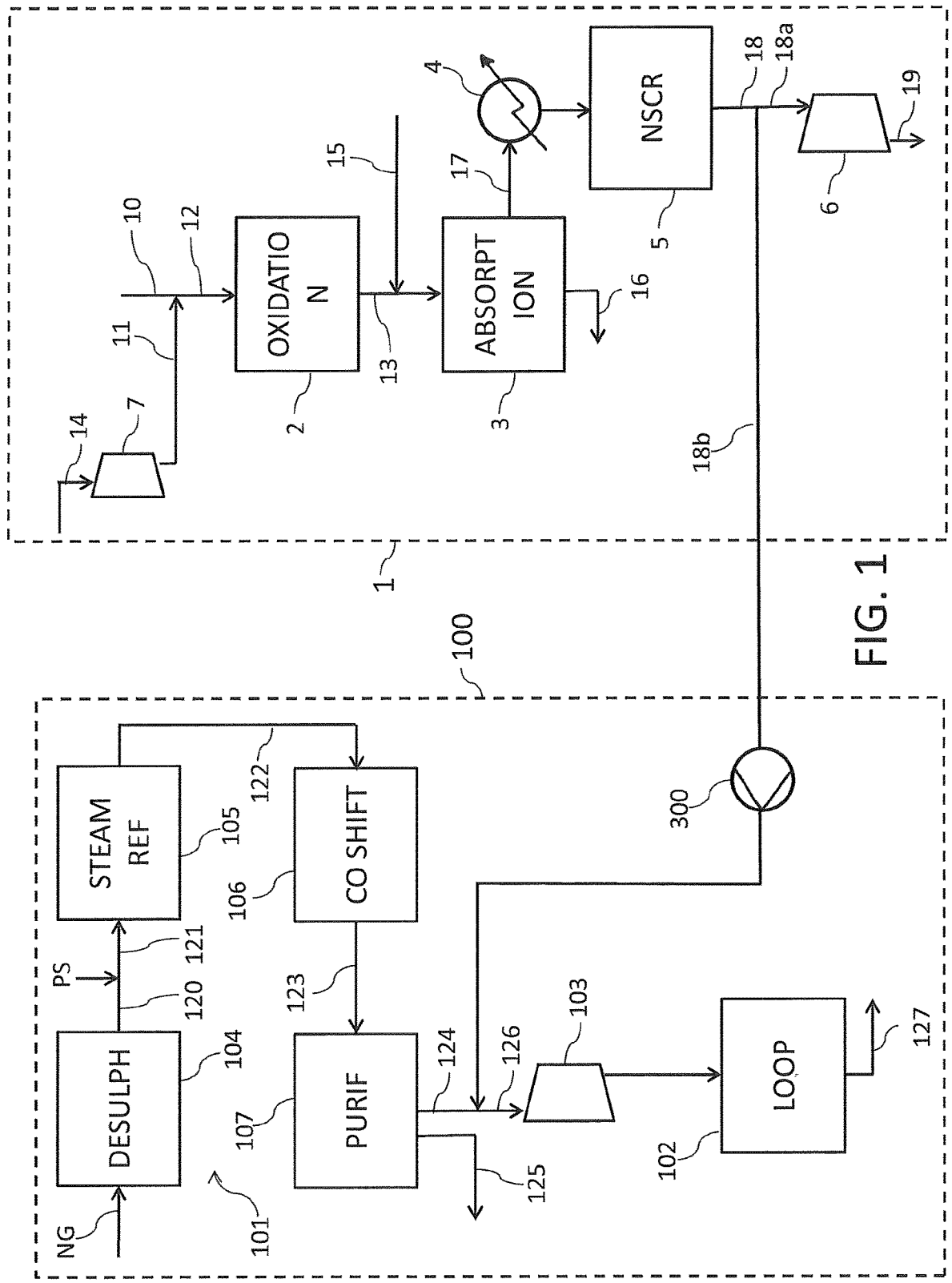
FIG. 1 shows a simplified block scheme of an integrated plant for the synthesis of ammonia and nitric acid according to a first embodiment of the invention, wherein reforming is carried out in a steam reformer.

The plant of FIG. 1 comprises a section 1 for the synthesis of nitric acid and a section 100 for the synthesis of ammonia.

Said section 1 essentially includes a reactor 2 for the catalytic oxidation of ammonia, an absorption tower 3, a heat exchanger 4, a nitrogen oxides removal unit 5, a gas expander 6 and an air compressor 7.

The operation of said section 1 is as follows.

An ammonia stream 10 and an air flow 11 are mixed to form the input stream 12 of the reactor 2, wherein ammonia is catalytically oxidized to nitrogen monoxide (NO) and in minor amounts to nitrous oxide ($N_2O$), and at least a portion of the nitrogen monoxide is further oxidized to nitrogen dioxide ($NO_2$) or dinitrogen tetroxide ($N_2O_4$), thus providing a gaseous stream 13.

Said air flow 11 provides the amount of oxygen required for the catalytic oxidation of ammonia and oxidation of nitrogen monoxide. The air compressor 7 is used for compressing an air flow 14 from atmospheric pressure to a suitable pressure before its admission into the reactor 2.

The term of "nitrogen oxides" or "$NO_x$" will be used below to denote the following: nitrogen monoxide, nitrogen dioxide, dinitrogen tetroxide and nitrous oxides.

The gaseous stream 13 is contacted with a stream of water 15 and admitted to the absorption tower 4, wherein $NO_x$ are at least partially absorbed in to yield nitric acid 16. Generally, said absorption tower 3 is a tray or packed column where $NO_x$ are absorbed in water to form nitric acid.

The absorption tower 3 also provides a tail gas 17 as overhead product, which is mostly composed of nitrogen and contains smaller amounts of oxygen and $NO_x$. Said tail gas 17 is pre-heated in the heat exchanger 4 and subsequently fed to the $NO_x$ removal unit 5, which provides a $NO_x$-depleted product gas 18.

According to the example of the figure, the NOx removal unit 5 carries out a non-selective catalytic reduction process (NSCR), thus providing a NOx-depleted product gas 18 essentially comprising nitrogen and substantially free of oxygen. Alternatively, a pressure swing adsorption (PSA) process can be used.

The $NO_x$-depleted product gas 18 from the $NO_x$ removal unit 5 splits into two portions, a first portion 18a is work-expanded in the expander 6 from the overhead pressure of the absorption tower 3 to the atmospheric pressure and a second portion 18b is exported from the nitric acid section 1 and fed to the ammonia section 100 to act as process nitrogen for the synthesis of ammonia.

Said expander 6 produces at least part of the power required by the compressors of the nitric acid plant, namely the air compressor 7 and, when a dual-pressure nitric acid process is carried out, a $NO_x$ compressor (not shown) of the feed stream to the absorption tower. The exhaust gas 19 is discharged into the atmosphere.

The section 100 for the synthesis of ammonia essentially includes a front-end section 101, which provides a make-up gas 126, and a synthesis loop 102, which converts said make-up gas into ammonia 129. The pressure of said make-up gas 126 is elevated to the pressure of the synthesis loop 102 in a syngas compressor 103. Said front-end section 101 essentially comprises a desulphurizer 104, a steam reformer 105, a carbon monoxide shift conversion section 106 (which may comprise for example a high temperature shift converter and a low temperature shift converter), a purification section 107.

The operation of said section 100 is as follows.

A natural gas feedstock NG enters said desulphurizer 104, resulting in a stream 120 of desuplhurized natural gas. Said stream 120 is mixed with a steam current PS generating a stream 121 of process gas, which enters the steam reformer 105, wherein it is reformed to provide a reformed gas 122 mostly composed of hydrogen and containing minor amounts of other components including e.g. carbon monoxide, carbon dioxide, water, methane.

Said reformed gas 122 is fed to the carbon monoxide shift conversion section 106, wherein carbon monoxide is converted into carbon dioxide to produce a shifted gas 123. Said shifted gas 123 is subjected to purification in the corresponding section 107. According to the example of the figure, said purification section 107 operates a pressure swing adsorption (PSA) process using molecular sieves, which provides a purified gas 124 essentially containing hydrogen and a CO2-containing tail gas stream 125.

Said $CO_2$-depleted gas 124 is mixed with the portion 18b from the $NO_x$ removal unit 5 of the nitric acid section 1 to provide the make-up gas 126 with the required $H_2:N_2$ molar ratio of around 3 for the ammonia synthesis reaction.

The so obtained make-up gas 126 is fed to the syngas compressor 103, wherein its pressure is elevated to the pressure of the synthesis loop 102. The make-up gas is then fed to the loop 102, wherein it is converted into ammonia 127.

The integration between the section 1 and the section 100 is realized as follows.

According to the example of the figure, the absorption tower 3 of the nitric acid 1 is operated at a lower pressure than the front-end section 101 of the ammonia section 100. For example, the absorption tower 3 is operated at a pressure of 5 bar and the front-end section 101 at a higher pressure of 15-20 bar.

As a consequence, said second portion 18b of the $NO_x$-depleted gas needs to be compressed to the front-end pressure. To this purpose, said portion 18b is sent to a nitrogen booster 300 before being introduced to the section 100. According to this example, said nitrogen booster 300 has a compression ratio higher than 3, compressing to 15-20 bar an inlet stream 18b at 5 bar.

The effluent of the nitrogen booster 300 is subsequently mixed with the hydrogen-containing gas 124 leaving the purification section 107, thus providing the make-up synthesis gas 126.

Figure 2:
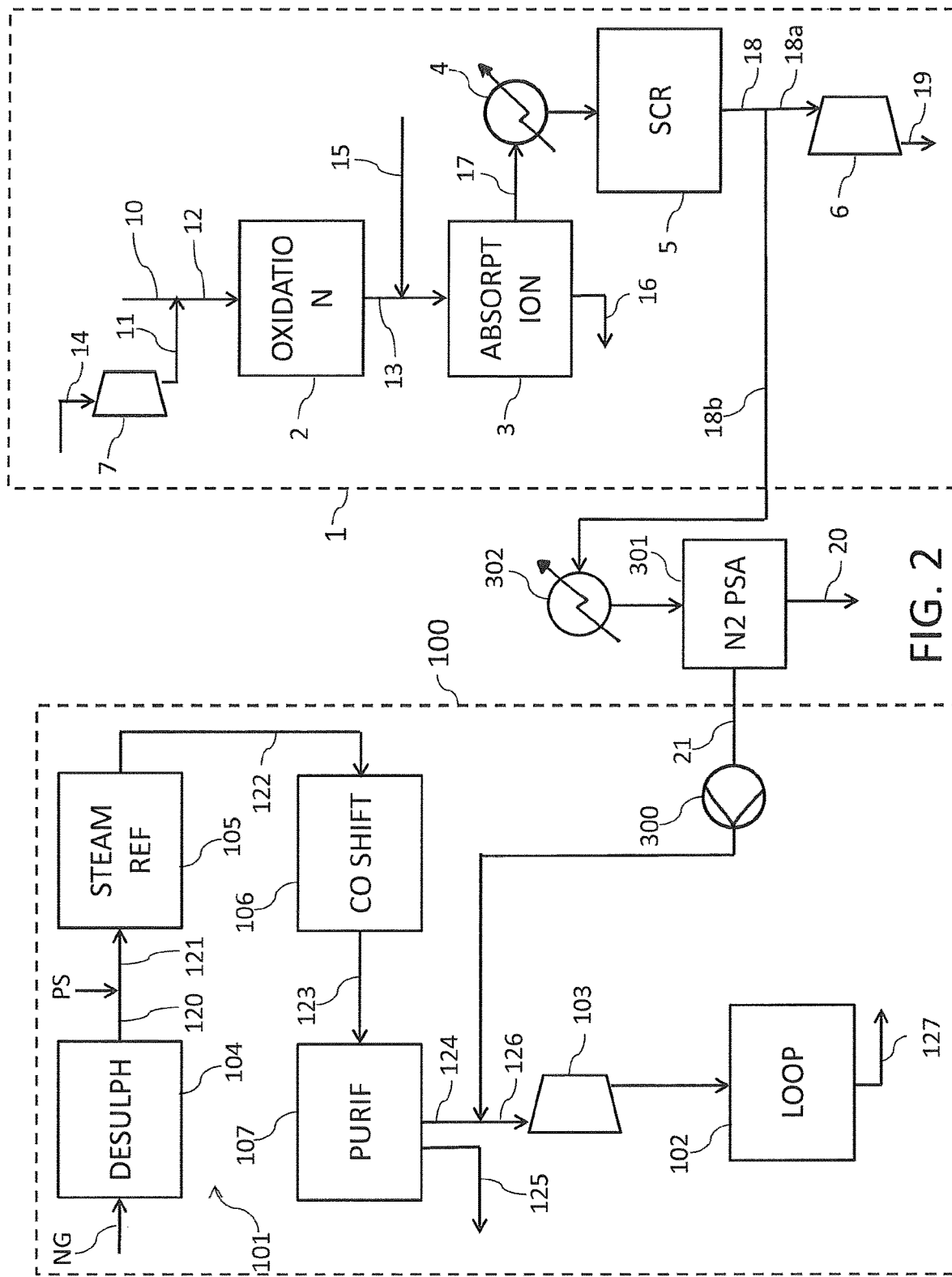
FIGS. 2 and 3 are variants of FIG. 1.

FIG. 2 shows a variant of the plant illustrated in FIG. 1. According to the example of this figure, the NOx removal unit 5 carries out a selective catalytic reduction process (SCR), thus providing a NOx-depleted product gas 18 essentially comprising nitrogen and also containing oxygen (<5% mol), which is detrimental for the ammonia synthesis catalyst and needs be removed. To this purpose, the second portion 18b of the NOx-depleted product gas is subjected to an oxygen removal treatment before being fed to the ammonia section 1.

According to the example of FIG. 2, said treatment is carried out in a pressure swing adsorption (PSA) unit 301 after cooling of said portion 18b in a heat exchanger 302. Said unit 301 provides an oxygen stream 20 and an oxygen-depleted stream 21, which is used as process nitrogen for the ammonia synthesis.

The nitrogen booster 300 shown in the figure is located downstream of the PSA unit 301 to elevate the pressure of said oxygen-depleted stream 21 to the front-end pressure. Alternatively, the nitrogen booster can be located upstream said PSA unit 301.

Figure 3:
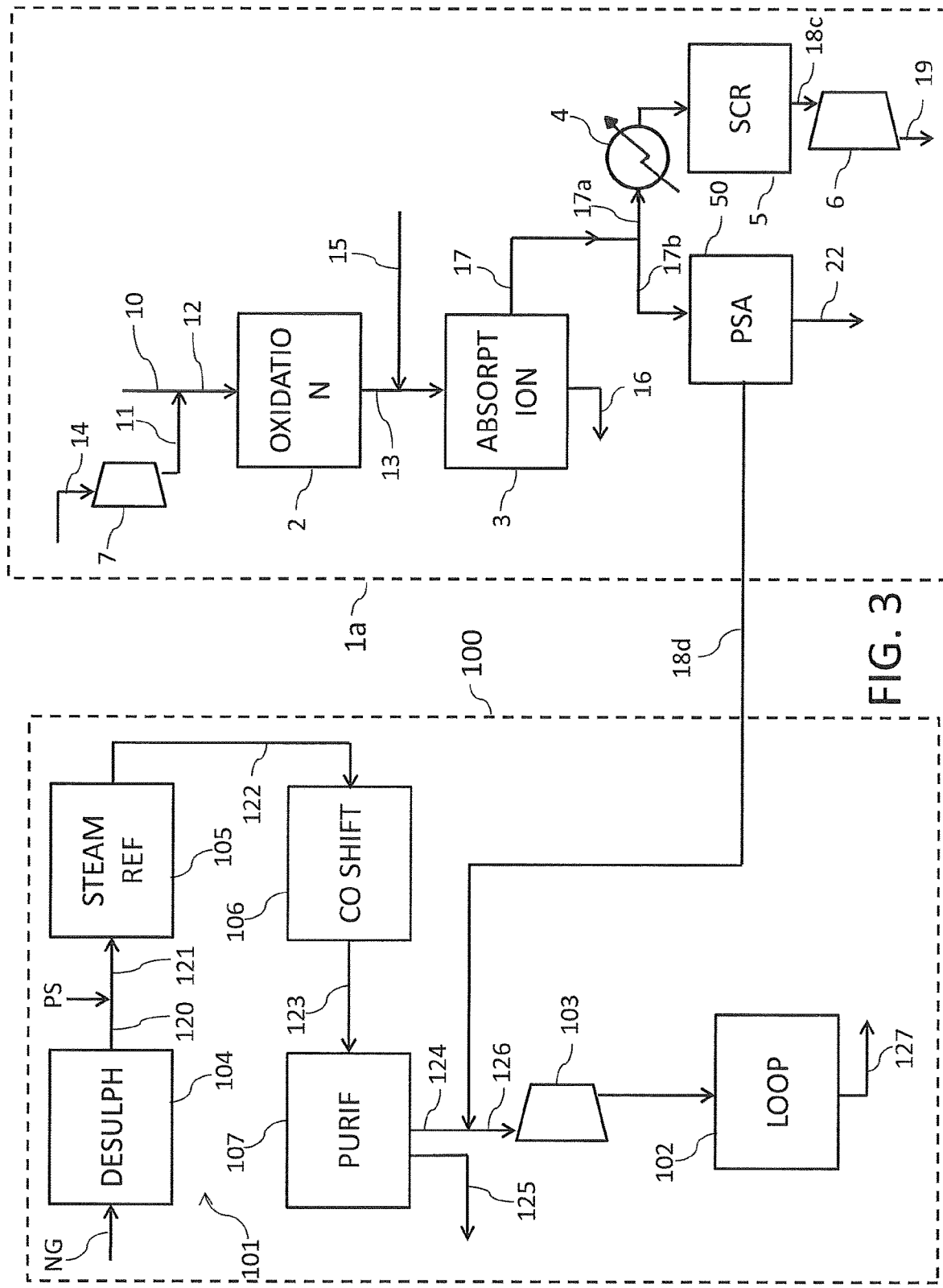

FIG. 3 shows a further variant of the plant illustrated in FIG. 1.

The tail gas 17 provided by the absorption tower 3 splits into a first portion 17a and a second portion 17b. Said first portion 17a is fed to a $NO_x$ removal unit 5 and said second portion 17b is fed to the $NO_x$ removal unit 50.

The nitric acid section is indicated, for this embodiment, with the reference number 1a.

According to the example of the figure, the NOx removal unit 5 carries out a selective catalytic reduction process (SCR), providing a NOx-depleted product gas 18c mainly comprising nitrogen and also containing some oxygen.

On the other hand, the NOx removal unit 50 is based on a pressure swing adsorption (PSA) process, which removes both $NO_x$ and $O_2$ into stream 22, thus providing a NOx-depleted product gas 18d essentially comprising nitrogen and substantially free of oxygen.

Said NOx-depleted product gas 18c is work-expanded in the expander 6, while said gas 18d is exported from the nitric acid section 1a and fed to the ammonia section 100 as process nitrogen for the synthesis of ammonia.

According to this example, the absorption tower 3 of the nitric acid 1a is operated substantially at the same pressure of the front-end section 101, e.g. at about 15 bar. Hence said NOx-depleted product gas 18d is mixed with the purified gas 124 to provide the make-up gas 126 without being previously compressed in a nitrogen booster as in FIGS. 1, 2.

Figure 4:
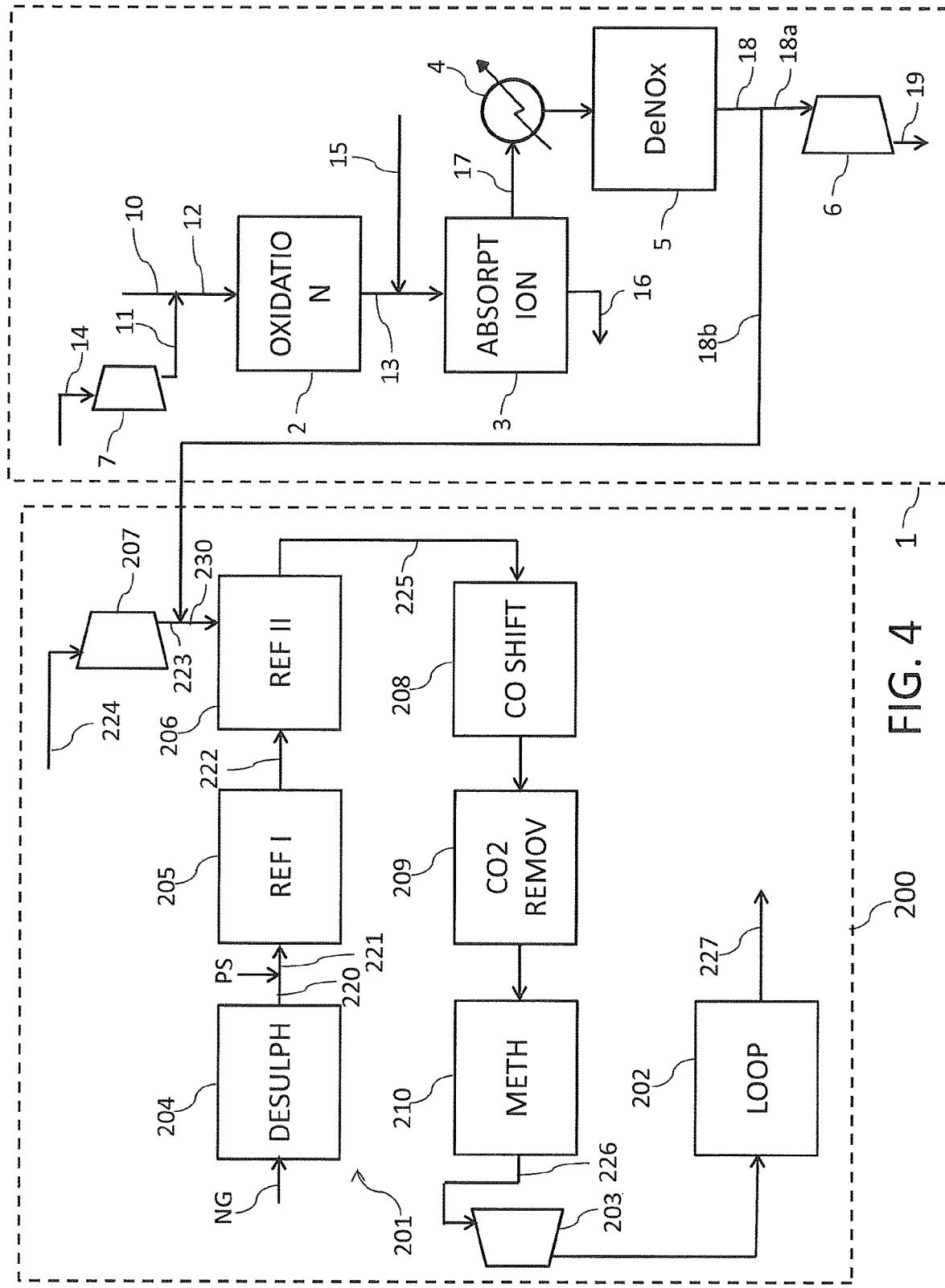
FIG. 4 shows a simplified block scheme of an integrated plant for the synthesis of ammonia and nitric acid according to a second embodiment of the invention, wherein reforming is carried out in a primary reformer and a secondary reformer.

FIG. 4 shows an integrated plant according to another embodiment of the invention. Said plant comprises the section 1 for the synthesis of nitric acid and a section 200 for the synthesis of ammonia.

The section 200 for the synthesis of ammonia includes a front-end section 201, a synthesis loop 202 and a syngas compressor 203. Said front-end section 201 essentially comprises a desulphurizer 204, a primary reformer 205, a secondary reformer 206, an air compressor 207, a carbon monoxide shift conversion section 208, a carbon dioxide removal section 209 and a methanator 210.

The operation of said section 200 is as follows.

A natural gas feedstock NG enters said desulphurizer 204, resulting in a stream 220 of desuplhurized natural gas. Said outlet stream 220 is mixed with a steam current PS generating a stream 221 of process gas, which enters the primary reformer 205, wherein it is converted in a mixture of carbon monoxide (CO), carbon dioxide ($CO_2$) and hydrogen by passage over a suitable catalyst. The reformed gas 222 delivered by the primary reformer 205 is then introduced into the secondary reformer 206, wherein reforming is achieved with the internal combustion of part of the reaction gas with an oxidant.

Said oxidant is provided by a stream 230, which is obtained by mixing the portion 18b of NOx-depleted tail gas with an air flow 223. Hence, said stream 230 also represents the nitrogen source to obtain the make-up gas.

The air compressor 207 is used for compressing the air 224 to a suitable pressure before its admission into the secondary reformer 206.

The reformed gas 225 leaving the secondary reformer is then purified in the carbon monoxide shift conversion section 208, carbon dioxide removal section 209 and methanator 212 to provide a make-up gas 226 with the required $H_2:N_2$ molar ratio of around 3 for the ammonia synthesis reaction. Said synthesis gas 226 is fed to the syngas compressor 203 and subsequently to the synthesis loop 207, wherein it is converted into ammonia 227.

According to the example of the figure, the absorption tower 3 and the front-end section 201 are operated at substantially the same pressure and no nitrogen booster is required on the flowline of the second portion 18b of the $NO_x$-depleted product gas.

On the other hand, when the absorption tower 3 is operated at a lower pressure than the front-end section, the portion 18b of the $NO_x$-depleted product gas is sent to a nitrogen compressor before being mixed with the air flow 223 and fed to the secondary reformer 206, or alternatively it is injected at an appropriate stage of the air compressor 207.

Example

With reference to FIG. 2, the advantage of the invention will be better elucidated by way of the example below.

The process for the synthesis of nitric acid is of the mono-pressure type, i.e. the reactor 2 and the absorption tower 3 are operated at substantially the same pressure of 6 bar, and the $NO_x$ removal unit is based on a SCR process.

The nitric production rate is 1,100 MTD (as 100% acid) and the ammonia production rate is of 630 MTD. The so obtained nitric acid will be neutralized with ammonia thereby producing ammonium nitrate, and ammonia is essentially produced in the amount needed to make the nitric acid and the ammonium nitrate.

According to this example, the total flow rate of the tail gas 18 from the SCR is 6,620 kmol/h. Said tail gas 18 contains about 97% of $N_2$, about 3% of $O_2$ and very small residual amounts of $NO_x$ and $NH_3$ (ppm level).

The nitrogen required for the ammonia production is 770 kmol/h. The PSA unit 301 has a nitrogen recovery of 85%. Hence, about 940 kmol/h of the tail gas 18, namely only about 14% of the whole tail gas flow rate, is routed to the PSA unit 301 as stream 18b at the nitric acid absorption pressure.

Since the feed stream of the PSA unit 301 is a nearly pure nitrogen stream, the amount of oxygen to be adsorbed is relatively small, which simplifies the PSA, requires a relatively small amount of adsorbent, and enables high recoveries of nitrogen. A high nitrogen recovery is desirable to minimize the flow rate of the tail gas slipstream, hence minimizing the loss of power recovery from the tail gas expander 6 compared to the prior art process.

The adsorbent materials of the PSA unit 301 are for example activated carbon (the so-called "carbon molecular sieves", CMS, also used for separating nitrogen from air), or zeolites.

The advantages in terms of performances of the process according to the invention over the prior art will become apparent from the comparison of the power balance for the most relevant machines, as shown in table 1.

In the process of the prior art, power is produced mainly by the tail gas expander and steam turbines in the nitric acid plant, while is consumed by the air separation unit and nitrogen compressor in the ammonia plant and the process air compressor in the nitric acid plant.

In the process according to FIG. 2, power is similarly produced by the tail gas expander 6 and steam turbines in the nitric acid section, while is consumed by the nitrogen booster 300 in the ammonia section and the process air compressor 7 in the nitric acid plant.

The other compressors in the ammonia process (i.e. syngas and ammonia refrigerant) have the same power consumption in the prior art and in the new process, hence they do not alter the result of the power balance comparison and are therefore herein neglected for sake of simplicity.

TABLE 1

Power balance, comparison

| | Prior art [kW] | New process (FIG. 2) [kW] |
|---|---|---|
| Air separation unit | −2 910 | 0 |
| Nitrogen compressor | −2 340 | 0 |
| Nitrogen Booster | 0 | −1 100 |
| Subtotal, ammonia plant | −5 250 | −1 100 |
| Process air compressor | −17 910 | −17 910 |
| Tail Gas Expander | 10 400 | 8 950 |
| Steam turbine | 12 320 | 12 320 |
| Subtotal, nitric acid plant | 4 810 | 3 360 |
| Total, ammonia and nitric acid plant | −440 | 2 260 |

As clear from the table above, the loss of power on the tail gas expander of the new process (of about 14%, or 1,450 kW) is surprisingly well compensated by the power saved in the air separation unit and in the nitrogen compressor.

As a result, while the power balance is negative for the prior art process, with an overall consumption of 440 kW, it is positive for the new process, with a power surplus of 2,260 kW.

Hence, the new process is not only less expensive, but also consumes less energy (or leaves more surplus for export).

The invention claimed is:

1. An integrated process for synthesis of ammonia and nitric acid, the integrated process including synthesizing the nitric acid by a method comprising:
    a) subjecting a stream of ammonia to oxidation, thereby obtaining a gaseous stream containing nitrogen oxides;
    b) subjecting said gaseous stream to a process of absorption of nitrogen oxides, thereby providing nitric acid and a first tail gas containing nitrogen and residual nitrogen oxides;
    c) subjecting at least a portion of said first tail gas to a process of removal of nitrogen oxides, thereby providing a second tail gas containing nitrogen and having a lower content of nitrogen oxides than said first tail gas; and
    d) synthesizing ammonia by catalytic conversion of a make-up gas including hydrogen and nitrogen in an ammonia synthesis loop;
    wherein at least a portion of said second tail gas is used as a nitrogen source for said make-up gas; and
    wherein the first tail gas provided by said step b) is entirely or partially subjected to said step c) and the resulting $NO_x$-depleted tail gas splits into two portions, a first portion being used as nitrogen source to obtain said ammonia make-up gas and a second portion being work-expanded, or
    wherein the first tail gas provided by said step b) splits into two portions, a first portion being subjected to said step c) and a second portion being subjected to a further step for removal of $NO_x$, thus providing two streams having a lower content of nitrogen oxides than said first tail gas, a first stream being a nitrogen source for said ammonia make-up gas and a second stream being work-expanded.

2. The integrated process according to claim 1, wherein said at least a portion of said second tail gas is added to a hydrogen-containing synthesis gas, thus providing said make-up gas.

3. The integrated process according to claim 2, wherein said hydrogen-containing synthesis gas is obtained by conversion of a hydrocarbon feedstock, said conversion including at least one of reforming or catalytic partial oxidation (CPOx).

4. The integrated process according to claim 2, wherein a pressure of said make-up gas is elevated to a pressure of the synthesis loop in a make-up gas compressor and said at least a portion of said second tail gas being supplied at a suction of said make-up gas compressor.

5. The integrated process according to claim 2, wherein said step b) is carried out substantially at a pressure of the hydrogen-containing synthesis gas, said pressure being is at least 15 bar.

6. The integrated process according to claim 2, wherein said second tail gas contains oxygen and said at least a portion of said tail gas includes a nitrogen source for said make-up gas is subjected to a process for oxygen removal, said process for oxygen removal includes a pressure-swing adsorption (PSA) process.

7. The integrated process according to claim 6, wherein said process for oxygen removal includes the PSA and including a start-up phase in which an air stream is subjected to said PSA process that provides a nitrogen-containing stream, said nitrogen-containing stream being used as nitrogen source for obtaining said make-up gas.

8. The integrated process according to claim 1, wherein said make-up gas is obtained by primary reforming of a hydrocarbon feedstock followed by secondary reforming or primary reforming of a hydrocarbon feedstock followed by catalytic partial oxidation (CPOx), the secondary reforming being carried out in a secondary reformer and the CPOx being carried out in a CPOx unit, and wherein said at least a portion of said second tail gas being a nitrogen source for said make-up gas is supplied at the inlet of said secondary reformer or at the inlet of said CPOx unit.

9. The integrated process according to claim 8, wherein the secondary reforming or the CPOx is carried out in a presence of an air stream, nitrogen required to obtain the make-up gas being partially provided by said second tail gas and a balance nitrogen being supplied by said air stream.

* * * * *